June 24, 1924.
C. W. TRINKAUS
COMBINATION TOOL
Filed July 11, 1923
1,499,130
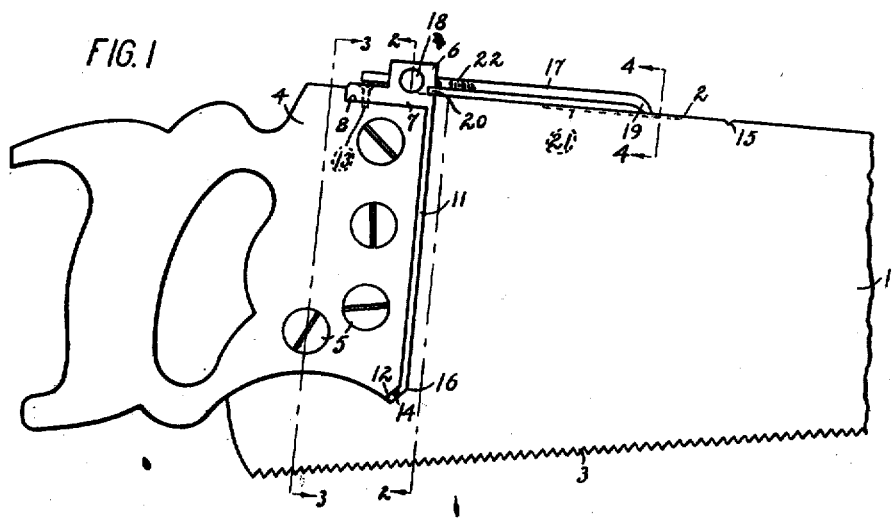
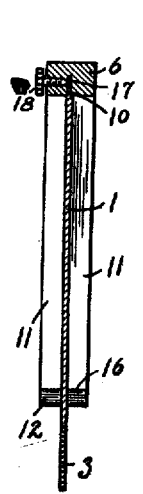
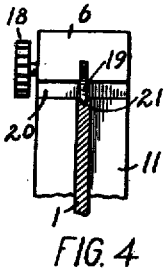
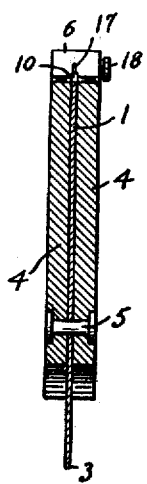
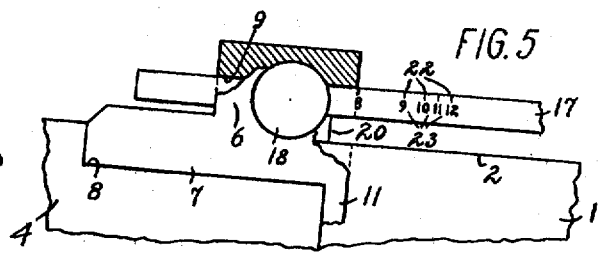
INVENTOR
C. WILLIAM TRINKAUS
BY R. W. Smith
ATTORNEY.

Patented June 24, 1924.

1,499,130

UNITED STATES PATENT OFFICE.

CHARLES WILLIAM TRINKAUS, OF LOS ANGELES, CALIFORNIA.

COMBINATION TOOL.

Application filed July 11, 1923. Serial No. 650,779.

*To all whom it may concern:*

Be it known that I, CHARLES WILLIAM TRINKAUS, a citizen of the United States, residing at Los Angeles, in the county of Los Angeles and State of California, have invented certain new and useful Improvements in Combination Tools, of which the following is a specification.

This invention is an attachment for saws adapting the same for use as a square, a 45° bevel, and as a gage for laying out the angular ends for sheathing for hip and valley roofs of any desired pitch.

It is the object of the invention to provide a saw having a straight back and an abutment surface extending across the blade at right angles thereto, so that said abutment surface and straight back of the saw will form a square; and to provide a mark upon the back of the saw, so positioned that a straight line connecting the same and the remote end of the abutment surface will form an angle of 45° with the back of the saw; and to also provide a gage slidable along the back of the saw and graduated for adjustment of said gage, so that a straight line connecting the end of the gage and the remote end of the abutment surface, will form an angle with the back of the saw conforming to any desired pitch of roof.

The invention will be readily understood from the following description of the accompanying drawings, in which:

Fig. 1 is a side elevation of a saw constructed in accordance with the invention;

Figs. 2, 3, and 4 are transverse sections on the lines 2—2, 3—3, and 4—4 of Fig. 1; and Fig. 5 is a detail side elevation of the improved construction, partly broken away.

The improved tool comprises an attachment mounted upon any usual saw having its blade 1 formed with a straight back 2, and having usual teeth 3. A handle 4 for the saw blade is forked in the usual manner so as to extend over the sides of the rear end of said blade, with one edge of said handle in alinement with the back of the blade. The handle may be fixed to the saw blade by the usual bolts 5.

An attachment adapted to be mounted upon the saw, comprises a bearing block 6 having a base 7 received in a recess 8 formed in the front portion of the edge of the handle which alines with the back of blade 1. The bearing block has a bore 9 extending therethrough longitudinally of the saw blade, and the attachment is forked from its lower end to the bore 9 by means of slot 10, so that the base of the bearing block may straddle the back of the saw blade. Abutment plates 11 depend from the front ends of forked base 7 and are received against the sides of blade 1 and the front edges of the handle 4.

The attachment is so mounted upon the saw, and the parts are so arranged, that the front surfaces of plates 11 are at right angles to the straight back 2 of the saw blade, and the ends of plates 11 remote from the back of the saw blade terminate in angularly disposed plates 12 which extend rearwardly from plates 11, and have front abutment surfaces arranged at angles of 45° to the back of the saw.

The front edges of the forked ends of handle 4 abut against the rear surfaces of plates 11 and 12, and the attachment is fixed to the saw by electro-welding, or by screws 13 extending through base 7 into handle 4, and by a screw 14 extending through blade 1 and the plates 12.

An indicating means, shown as a notch 15, is provided upon the straight back of the saw blade, at such a distance from the front abutment surfaces of plates 11, that a straight line connecting said notch and the angle 16 formed by plates 11 and 12, will lie at an angle of 45° to the back of the saw.

A graduated gage 17 is slidable in bore 9 of bearing block 6, and may be fixed in adjusted position by a thumb-screw 18. The gage is spaced above the straight back 2 of the saw blade, and the front end of base 7 is recessed above the back of the saw as shown at 20, in order to provide a space adapted to receive a pencil or other marking implement.

The gage 17 is preferably of less thickness than the saw blade, so as not to bind in the cut made by the saw, and the front end of the gage curves downwardly as shown at 19, and is received in a groove 21 formed in and extending along straight back 2 of the saw blade.

Graduations 22 are provided upon the gage, and are so positioned that when the gage is adjusted longitudinally of the saw blade, for alinement of the respective graduations with the front edge of block 6, straight lines connecting the angle 16 and the front of curved end 19 of the gage, will lie at angles to the straight back of the saw, which conform to the required angular ends for sheathing adapted to fit the valleys of roofs having a pitch corresponding to indices 23 for the graduations 22.

By the construction as thus described, it will be seen that when one of abutment surfaces 11 is placed against the edge of a plank, the straight back 2 of the saw blade extending across the plank will form a right angle; and when the saw is placed upon a plank so that the edge of the latter alines with a straight line connecting notch 15 and angle 16, the straight back of the saw will extend across the plank at an angle of 45°; and when the saw is placed upon a plank so that the edge of said plank alines with a straight line connecting angle 16 and the front end 19 of the gage, the straight back of the saw will extend across the plank at an angle corresponding to the graduated adjustment of the gage. The gage being graduated for different pitches of roofs, an angle conforming to any desired pitch may thus be formed.

It will be apparent that various changes may be made in the construction, combination, and arrangement of parts as thus described, without departing from the spirit of the invention.

What is claimed is:

1. A saw having a blade provided with a straight back, an abutment on said blade in spaced relation from said back, and a gage slidable along the back of said blade, said gage being graduated for adjustment relative to said blade and having indices for said graduations arranged whereby straight lines connecting the adjusted gage and said abutment will form predetermined angles with said straight back as indicated by said indices.

2. A saw having a blade provided with a straight back, an abutment surface extending across said blade at a predetermined angle to said straight back, the straight back of said blade having a graduation so positioned that a straight line connecting the same and the end of said abutment surface will form a predetermined angle with said straight back, and a gage slidable along the back of the blade, said gage being graduated for adjustment relative to said blade and having indices for said graduations arranged whereby straight lines connecting the adjusted gage and the end of said abutment surface will form predetermined angles with said straight back as indicated by said indices.

3. A saw comprising a handle, a blade having a straight back, an abutment on said blade in spaced relation from said straight back, a bearing extending beyond the back of said blade at the handle, a gage slidable in said bearing block along the back of said blade and graduated for adjustment of said gage relative to said bearing block so that straight lines connecting the end of the adjusted gage and said abutment will form predetermined angles with the back of the blade.

4. A saw comprising a handle, a blade having a straight back, an abutment surface lying against the side of the blade and the front of the handle and having an extension thereof forming a bearing block beyond the back of the blade, and a gage slidable in said bearing block for adjustment along the back of the blade to form predetermined angles between the end of the adjusted gage and the end of said abutment surface.

5. A saw having a blade, an abutment surface on said blade, a gage having an abutment end and extending along the back of the blade beyond the same and lying wholly between the planes of the sides of said blade, and means for adjusting said gage along the back of said blade.

6. A saw having a blade provided with a straight back, an abutment on said blade in spaced relation from said straight back, and a gage slidable along said back and lying wholly between the planes of the sides of said blade, said gage being graduated for adjustment thereof so that straight lines connecting the end of the adjusted gage and said angular abutment will form predetermined angles with said straight back.

7. A saw having a blade provided with a straight back, an angular abutment on said blade in spaced relation from said straight back, and a gage slidable along the back of said blade, said gage being graduated for adjustment thereof relative to said blade, and having indices for said graduations arranged whereby straight lines connecting the end of the adjusted gage and said angular abutment will form predetermined angles with said straight back corresponding to the pitch of different roofs as indicated by said indices.

8. A saw having a blade provided with a straight back, an abutment surface extending across said blade at right angles to said straight back and terminating in an abutment angle, the straight back of said blade having a graduation so positioned that a straight line connecting the same and said abutment angle will form an angle of 45° with said straight back, and a gage slidable along the back of the blade, said gage being graduated for adjustment thereof relative to said blade, and having indices for said graduations arranged whereby straight lines connecting the end of the adjusted gage and said angular abutment will form predetermined angles with said straight back corresponding to the pitch of different roofs as indicated by said indices.

In testimony whereof I have affixed my signature to this specification.

C. WILLIAM TRINKAUS.